US008430061B2

(12) United States Patent
Tamaru et al.

(10) Patent No.: US 8,430,061 B2
(45) Date of Patent: *Apr. 30, 2013

(54) METHOD AND APPARATUS FOR PROCESSING A LARGE NUMBER OF FISH EGGS

(75) Inventors: Yutaka Tamaru, Tsu (JP); Hideo Miyake, Tsu (JP); Masatoshi Hashimoto, Matsusaka (JP); Masaru Obata, Matsusaka (JP)

(73) Assignee: Hashimoto Electronic Industry Co., Ltd., Mie (JP)

( * ) Notice: Subject to any disclaimer, the term of this patent is extended or adjusted under 35 U.S.C. 154(b) by 300 days.

This patent is subject to a terminal disclaimer.

(21) Appl. No.: 12/908,221

(22) Filed: Oct. 20, 2010

(65) Prior Publication Data

US 2012/0097111 A1    Apr. 26, 2012

(51) Int. Cl.
  *A01K 61/00*    (2006.01)
(52) U.S. Cl.
  USPC ............ 119/218; 119/215; 119/216; 119/217
(58) Field of Classification Search .................. 119/217, 119/218, 215, 6.6, 6.8
  See application file for complete search history.

(56) References Cited

U.S. PATENT DOCUMENTS

| 5,262,128 | A  | * | 11/1993 | Leighton et al. | ............... | 422/522 |
| 6,477,987 | B2 | * | 11/2002 | Taylor | ............................ | 119/843 |
| 2008/0077329 | A1 | | 3/2008 | Sun et al. | | |
| 2011/0174230 | A1 | * | 7/2011 | Tamaru et al. | ................. | 119/218 |
| 2012/0097110 | A1 | * | 4/2012 | Tamaru et al. | ................. | 119/217 |

FOREIGN PATENT DOCUMENTS

| GB | WO98/15627 | | 4/1998 |
| JP | 07303883 | * | 11/1995 |
| JP | 2001-501482 | | 2/2001 |
| JP | 2001-120110 | | 5/2001 |
| JP | 2001-501482 | | 6/2001 |
| JP | 2004-166553 | | 6/2004 |
| JP | 2007-222132 | | 6/2007 |
| JP | 2009-261338 | | 11/2009 |

OTHER PUBLICATIONS

Yutaka Tamaru, "Research and Development of Combinatorial Bioengineering Using Zebrafish and Its Application on Drug Discovery", Yakugaku Zasshi, vol. 129 (11) The Pharmaceutical Society of Japan, pp. 1285-1293, (2009). [English Abstract].
Wenhui Wang, et al., "A Fully Automated Robotic System for Microinjection of Zebrafish Embryos", PLOS ONE, Sep. 2007: Issue 9: e862, pp. 1-7.

* cited by examiner

*Primary Examiner* — Kimberly Berona
*Assistant Examiner* — Marc Burgess
(74) *Attorney, Agent, or Firm* — Duane Morris LLP

(57) ABSTRACT

It is an object of the invention to provide a method and an apparatus for processing a very large number of fish eggs for gene injection and so on with a superior performance. An egg case has an egg-arranging plate and a cover plate. The fish eggs are dropped into concave portions of the egg-arranging plate, when the cover plate opens the concave portions. The cover plates closes the concave portions after fish eggs are accommodated in the concave portions.
The egg case is fixed on a table of an egg-arranging apparatus. water is supplied on the egg-arranging plate in the egg plate. A scanning nozzle sprays water on upper surface of the egg-arranging plate. After closing the concave portions with the cover plate, the egg case is inclined for dropping fish eggs remaining on the cover plate.

10 Claims, 7 Drawing Sheets

METHOD AND APPARATUS FOR PROCESSING A LARGE NUMBER OF FISH EGGS

BACKGROUND OF THE INVENTION

1. Field of the Invention

The present invention relates to a method for processing a large number of fish eggs, in particular to an automated method for processing fertilized fish eggs. The invention can be employed for production method of producing genetically recombinant proteins and so on from fertilized fish eggs by gene injection. Moreover, the invention can be employed to produce materials by means of using fertilized fish eggs.

2. Description of the Related Art

A method to produce specific protein is known by injecting gene material to the fertilized egg of the fish. This protein-producing method may have high productivity, because the specific fish such as the zebra fish lay eggs approximately every day.

The gene material must be injected into each fish eggs before dividing of a cell of the fertilized fish egg is started. However, a very large number of the fish eggs employed for the gene-injection is very small. For example, the eggs of the zebra fish have a diameter of about 1 mm. It is not easy to deal very large number of small fish eggs within a short time. Moreover, the injection apparatus for injecting the gene material into the small fish egg is expensive, because precision control is required for an injection needle to inject the gene material into the very small fish egg.

Japan Unexamined Patent Publication No. 2007/222,132 proposes an egg-arranging plate for arranging fish eggs. A large number of concave portions are formed on a top surface of the egg-arranging plate. Each bottom of concave portions has each drainage aperture with a narrow path for draining water. Each one of fish eggs must be caught in each one of concave portion by the water passing through the concave portion. However, the fish egg dropped in the concave portion is easy to leave the concave portion by moving of the water or the egg-arranging plate.

The Publication No. 2007/222,132 proposes the concave portion having a narrow aperture to prevent that the fish egg in the concave portion leaves the concave portion too. However, it becomes difficult for the fish egg to drop into the concave portion, too. Moreover, the fish egg has damage, because a negative pressure of the concave portion must be increased for absorbing the fish egg.

Nextly, dropping the fish eggs into almost of the concave portions needs long time. Furthermore, remaining of the fish egg on the egg-arranging plate causes an error of gene-injection. Moreover, inserting of a needle for injecting gene materials is not easy, because the fish egg is very small and easy to be moved by forcing of the needle.

U.S. Patent Application Publication No. 2008/0077329A1 proposes to prevent the moving of the fish egg by means of absorbing the fish egg with the negative pressure of the concave portion. However, the fish egg must be absorbed by the small holes strongly. As the result, the fish egg may have damage.

SUMMARY OF THE INVENTION

It is an object of the invention to provide a method and an apparatus for processing a very large number of fertilized fish eggs. It is another object to provide an egg-arranging apparatus for processing a very large number of fertilized fish eggs for gene injection and so on. It is another object to provide a method and an apparatus for producing genetically recombinant proteins and so on from a very large number of fertilized fish eggs with superior performance.

According to an aspect of the present invention, an egg case, an egg-arranging apparatus and an injecting apparatus are provided. The egg case has an egg-arranging plate on which a large number of concave portions are formed at predetermined positions on an upper surface of the egg-arranging plate. The egg-arranging apparatus arranges each fish egg into each concave portion of the egg-arranging plate. The gene-injecting apparatus injects materials and so on to a large number of the fish eggs arranged in the concave portions.

The method of invention further comprises the steps of: a first case-setting step, an egg-arranging step, a second case-setting step and an injecting step. The first case-setting step sets the egg case at the predetermined arranging position of the egg-arranging apparatus. The egg-arranging step arranges each of fish eggs in each of the concave portions by means of draining water through the concave portions.

The second case-setting step sets the egg case at the predetermined injection position of the gene-injecting apparatus. The gene-injecting step injects gene materials to a large number of the fish eggs arranged in the concave portions of the egg-arranging plate. In the other words, the positions of the fish eggs on the injection apparatus are determined, when the egg case is set at a predetermined position of the injection apparatus, because the fish eggs has the predetermined positions on the egg case. Accordingly, the injection apparatus can have easy position control of an injection needle.

According to a preferred embodiment, each of the concave portions has each drainage-through-hole through which the water in each of the concave portions flows downwardly. The egg case holds a cover plate capable of sliding on the egg-arranging plate. The cover plate opens the concave portions, when the cover plate is positioned at a first position. The fish egg is accommodated in the concave portion. The cover plate closes the concave portions, when the cover plate is positioned at a second position. The fish egg can not leave the concave portion. Accordingly, the egg case can keep each fish egg at a predetermined position on the egg-arranging plate even though the egg case is moved.

According to another preferred embodiment, the egg case with rectangular-box-shape has sidewalls surrounding and holding the egg-arranging plate and the cover plate, which are arranged in parallel. As the result, it is prevented that the water with fish eggs flows from the egg-arranging plate. Moreover, the fish eggs on the egg-arranging plate can be kept and protected in the water layer on the egg-arranging plate.

According to another preferred embodiment, the cover plate slides to the first position before the egg-arranging step and to the second position after the egg-arranging step. Accordingly, arranging of the fish eggs and keeping positions of the fish eggs are operated with simple structure.

According to another preferred embodiment, the cover plate has injection-through-holes capable of inserting an injection needle into the concave portion. The needle is inserted into the fish eggs in the concave portion through the injection-through-hole. The injection-through-hole has smaller diameter than the fish egg. Accordingly, it is prevented simply that the fish egg accommodated in the concave portion is moved by the needle of the injection apparatus.

According to another preferred embodiment, the egg-arranging apparatus has a water-circulating passage for returning water dropping through the concave portion and the drainage-through-hole to an upward position of the egg-arranging plate. As the result, the water layer can be kept on the egg-arranging plate during the egg-arranging operation. The fish eggs can be moved on the egg-arranging plate until the fish egg drops down in the concave portion. Damage of the fish eggs is reduced.

According to another preferred embodiment, the egg-arranging apparatus has a nozzle and a nozzle-scanning actuator. The nozzle disposed in an upward portion of the egg-arranging plate sprays water on the upper surface of the egg-arranging plate. The nozzle-scanning actuator scans the nozzle in a course parallel to the upper surface of the egg-arranging plate. Accordingly, the fish egg near the concave drops into the concave portion by forcing of the water sprayed from the nozzle.

According to another preferred embodiment, the egg-arranging apparatus has a case-inclining actuator inclining the egg case. The case-inclining actuator drops the water from the upper surface of the egg-arranging plate by means of inclining the egg-arranging plate. The eggs in the water are dropped, too.

According to another preferred embodiment, the egg case has a slanted slope disposed on one of four inner side surface of the sidewall of the egg case. As the result, the fish eggs remaining on the cover case can be drained out over the slanted slope easily, when the egg case is inclined.

DETAILED DESCRIPTION OF THE PREFERRED EMBODIMENT (Explanation of the Production Method)

Figure 1:
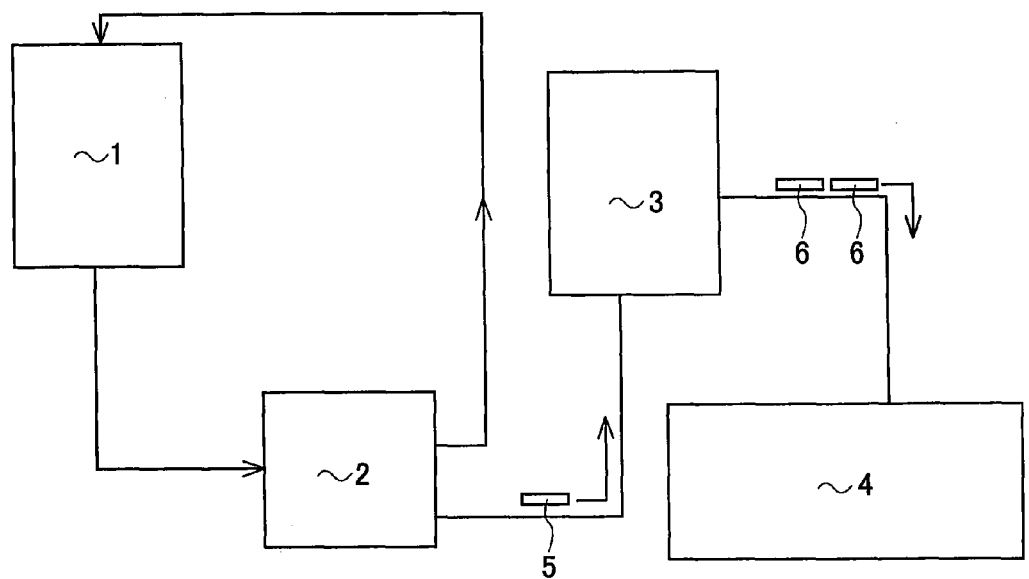
FIG. 1 is a schematic diagram showing a protein-producing system of the embodiment.
Figure 2:
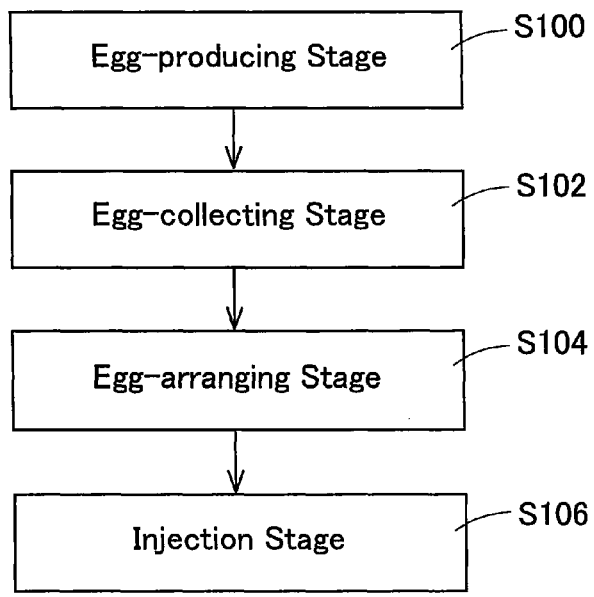
FIG. 2 is a flow diagram showing a protein-producing process operated with the system shown in FIG. 1.

The production method for producing genetically recombinant proteins from fertilized fish eggs is explained referring to FIGS. 1 and 2. FIG. 1 shows a schematic diagram of a protein-producing system. FIG. 2 shows a flow diagram of a protein-producing process.

The protein-producing system shown in FIG. 1 has an egg-producing apparatus 1, an egg-collecting apparatus 2, an egg-arranging apparatus 3 and a gene-injecting apparatus 4. The egg-producing apparatus 1 executing an egg-producing stage S100 has a water tank apparatus for breeding a predetermined number of pairs of zebra fishes.

The egg-collecting apparatus 2 executing an egg-collecting stage S102 collects fish eggs from drainage of the water tank apparatus. The drainage returns to the water tank apparatus after purifying. The egg-arranging apparatus 3 executing an egg-arranging stage S104 arranges the collected fish eggs. The injection apparatus 4 executing a gene-injecting stage 5106 injects the gene material into the fish eggs each.

Water of the water tank apparatus is drained to the egg-collecting apparatus 2. The fish eggs are collected by an egg-collecting case 5 in the egg-collecting apparatus 2. The egg-collecting case 5 is transferred from the egg-collecting apparatus 2 to the egg-arranging apparatus 3. The fish eggs are arranged on an egg case 6 in the egg-arranging apparatus 3. The egg case 6 is transferred from the egg-arranging apparatus 3 to the gene-injecting apparatus 4, after the fish eggs have been arranged.

(Explanation of Egg Case 6)

Figure 3:
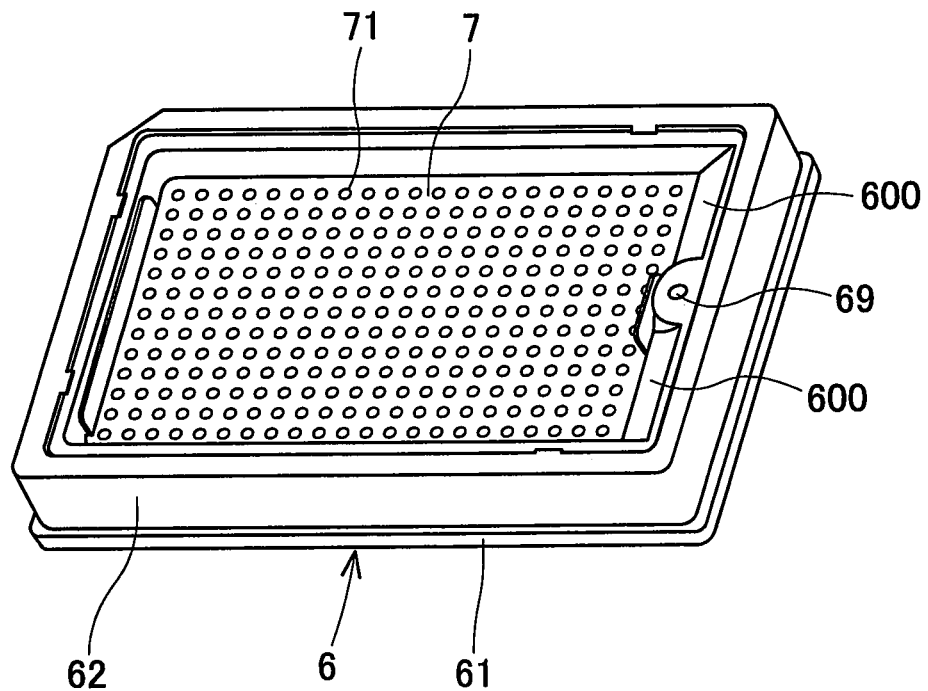
FIG. 3 is a perspective view of the egg case.
Figure 4:
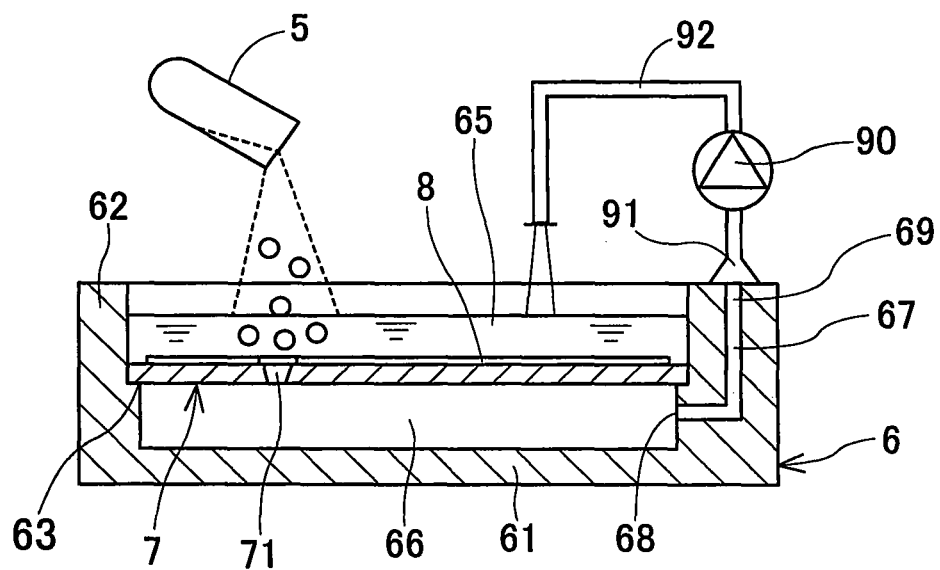
FIG. 4 is schematic cross-section showing an egg-arranging step.
Figure 5:
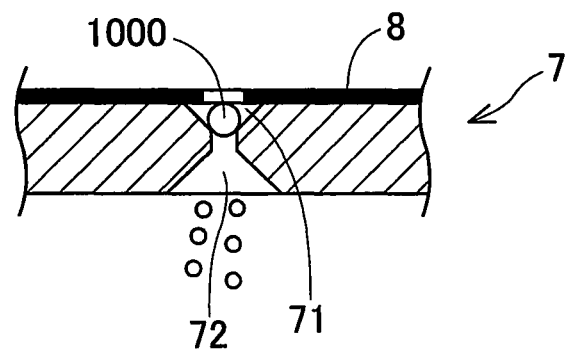
FIG. 5 is an enlarged partial cross-section showing one concave portion of an egg-arranging plate and a cover plat.

The egg case 6 is explained referring to FIGS. 3-5. FIG. 3 is a perspective view of the egg case 6. FIG. 4 is schematic cross-section showing the egg-arranging step. FIG. 5 is an enlarged partial cross-section showing one concave portion of an egg-arranging plate 7 and a cover plate 8.

Figure 8:
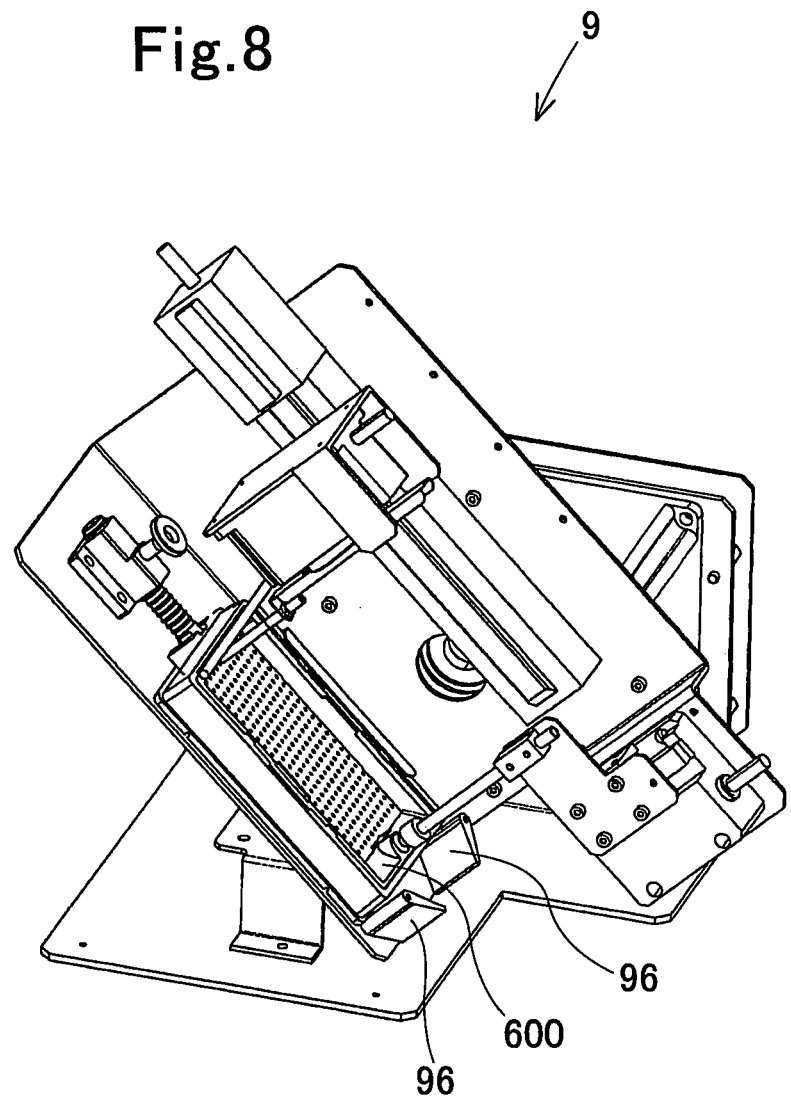
FIG. 8 is a perspective view of the egg-arranging apparatus having a configuration that egg-arranging apparatus 9 inclines the egg case.

In FIG. 3, the rectangular-box-shaped egg case 6 has a bottom plate 61 and a sidewall 62 surrounding the bottom plate 61. The rectangular-shaped sidewall 62 is standing from a penumbra of flat bottom plate 61. An upper aperture of egg case 6 is sectioned by the sidewall 62. In FIG. 3, the egg-arranging plate 7 having concave portions 71 are shown on the bottom plate 61. Furthermore, one of four inner side surface of the sidewall 62 has two slanted slopes 600. The fish eggs in the water on the cover plate 8 can be drained over the slanted slopes 600 easily, when the egg case 6 is inclined to drain the fish eggs which are remained. The inclined egg case 6 is shown in FIG. 8.

In FIG. 4, an inner surface of the sidewall 62 has a step portion 63 on which the egg-arranging plate 7 is equipped. An inner space of egg case 6 is divided into an upper chamber 65 and a lower chamber 66 by egg-arranging plate 7 being in parallel to bottom plate 61. Moreover, the sidewall 62 has drainage-through-hole 67 having an inlet 68 communicated to the lower chamber 66. An outlet 69 of the drainage-trough-hole 67 is formed on a top surface of the sidewall 62.

In FIG. 4, a suction pump 90 of an egg-arranging apparatus 9 described later absorbs water from the lower chamber 66 through the drainage-through-hole 67. An inlet portion of the suction pump 90 is connected to an inlet pipe 91 of egg-arranging apparatus 9. An outlet of suction pump 90 is connected to a water-supplying pipe 92. The inlet pipe 91 comes into contact with the outlet 69 of drainage-trough-hole 67. The water-supplying pipe 92 supplies water in egg case 6. Inlet pipe 91, suction pump 90 and water-supplying pipe 92 constitutes a water-circulating passage of the egg-arranging apparatus 9 described later.

A large number of concave portions 71 arranged in the letter of a line are formed on an upper surface of egg-arranging plate 7 as shown in FIG. 3. Each of the cone-shaped concave portions 71 is communicated into lower chamber 66 by each cone-shaped drainage-through-hole 72 formed on a back surface of the egg-arranging plate 7. Accordingly, water in concave portions 71 drops downwardly in lower chamber 66 through the drainage-through-hole 72. The smallest diameter of concave portions 71 is smaller than a diameter of the fish egg 1000.

Egg case 6 holds a cover plate 8 capable of sliding on egg-arranging plate 7. The very thin cover plate 8 is equipped on the upper surface of egg-arranging plate 7. The cover plate 8 opens concave portions 71, when cover plate 8 is positioned at a first position. Cover plate 8 closes concave portions 71, when cover plate 8 is positioned at a second position. FIG. 5 shows the cover plate 8 has the second position.

Cover plate 8 has a projection for sliding the cover plate. However, the projection is not shown in the drawings. Cover plate 8 has large apertures (not shown) and small apertures 81. Each of the large apertures consisting of egg-through-holes is positioned on each of concave portions 71, when the cover plate 8 has the first position. Each of fish eggs on the cover plate 8 can pass through each of the large apertures, and drops in each of concave portions 71.

Each of the small apertures 81 is positioned on each of the concave portions 71, when the cover plate 8 has the second position. Each of fish eggs 1000 in each of concave portions 71 can not pass through each of the small apertures 81. A gene-injection needle can be inserted through the small apertures 81 consisting of injection-through-holes. However, the small apertures 81 can be abbreviated. The gene-injection needle should be inserted through the large apertures, if small apertures 81 are abbreviated. In this embodiment, the egg case 6 is made from resin material. The egg-arranging plate 7 and the cover plate 8 are made of stainless steel plates.

(Structure of Egg-Arranging Apparatus 9)

Figure 6:
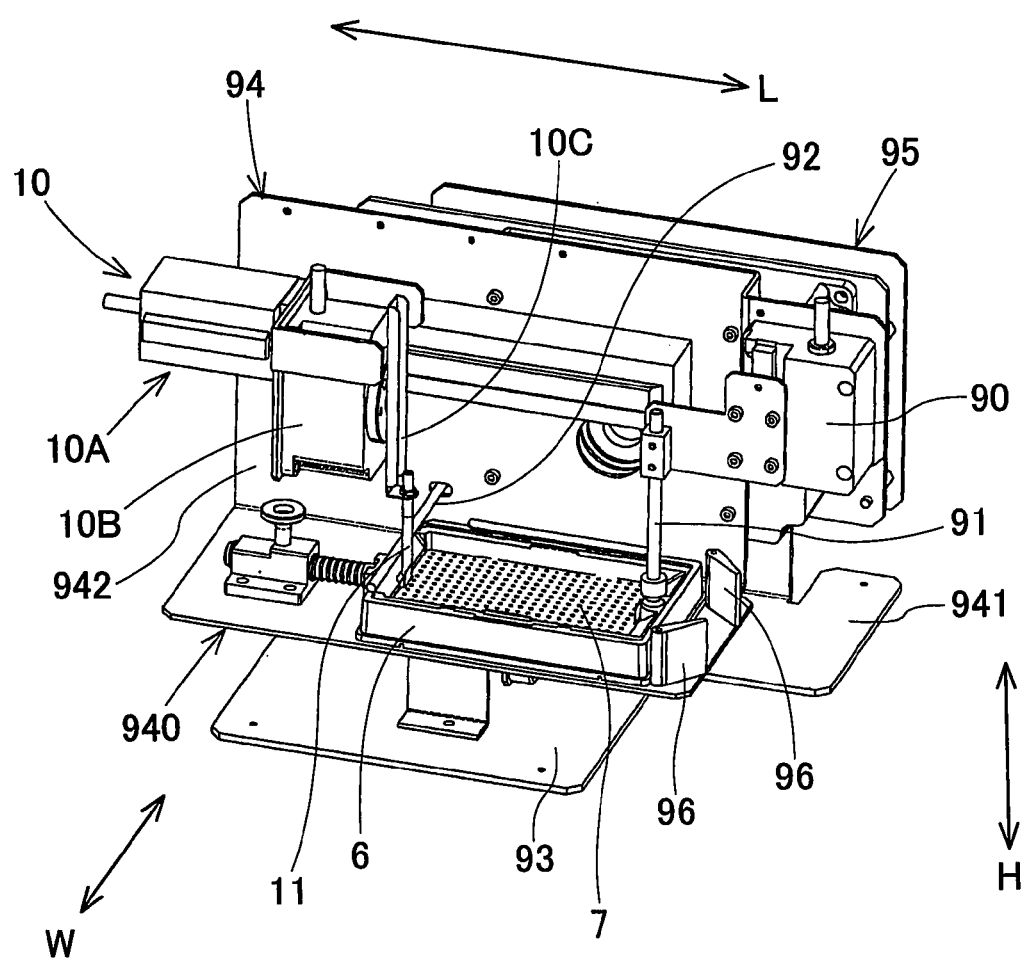
FIG. 6 is a perspective view of the egg-arranging apparatus having a configuration that a nozzle is positioned at a starting position of scanning.
Figure 7:
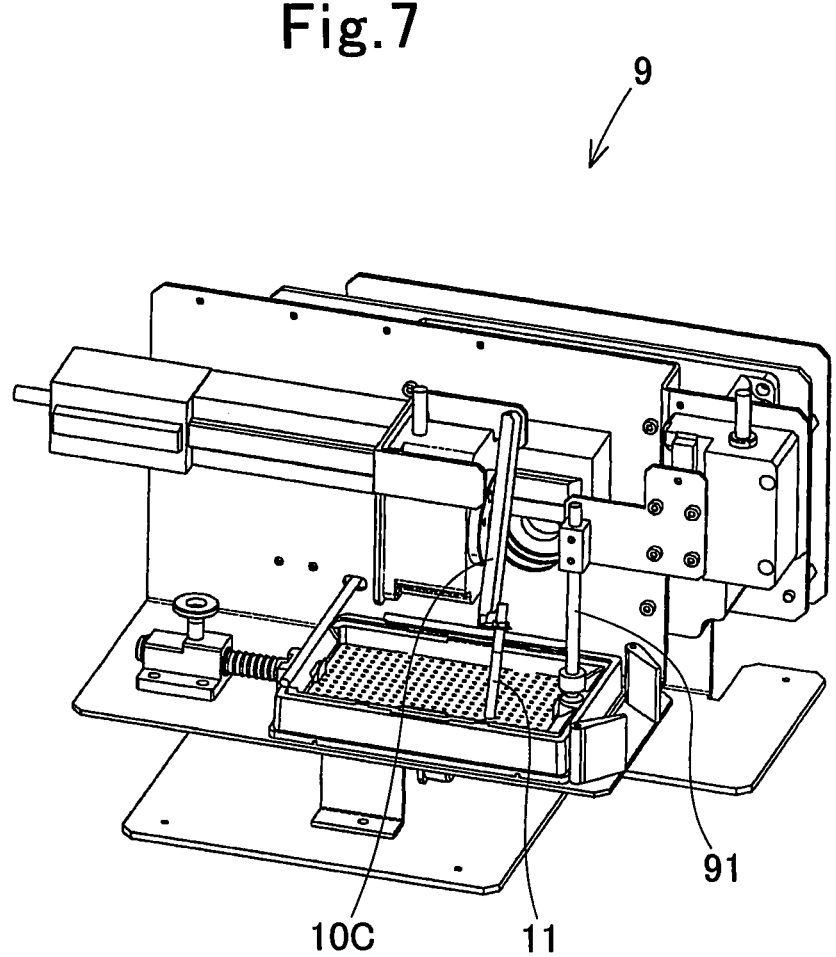
FIG. 7 is a perspective view of the egg-arranging apparatus having a configuration that a nozzle is scanning.

Egg-arranging apparatus 9 is explained referring to FIGS. 6-8. FIGS. 6-8 are a perspective view of the egg-arranging apparatus 9. FIG. 6 shows a configuration that a nozzle 11 is positioned at a starting position of scanning. FIG. 7 shows a configuration that the nozzle 11 is scanning. FIG. 8 shows a configuration that egg-arranging apparatus 9 inclines the egg case 6.

Egg-arranging apparatus 9 has a base plate 93, a main portion 94 and an inclining actuator 95. The inclining actuator 95 is fixed on the base plate 93. Inclining actuator 95 consisting of the case-inclining actuator has an axis (not shown) swinging the main portion 94 in a two dimensional space extending vertically. The axis of the inclining actuator 95 is driven by a geared motor (not shown), which is accommodated in the inclining actuator 95.

Egg case 6 fixed on the main portion 94 is slant, when the inclining actuator 95 inclines the main portion 94. As the result, the water layer including fish eggs drops downwardly via the drainage passage between two guiding gates 96 as shown in FIG. 8.

Main portion 94 has a character-L-shaped angle plate 940 consisting of a table portion 941 and a wall portion 942. In FIG. 6, the table portion 941 extends horizontally, and the wall portion 942 extends vertically. One egg case 6 is fixed to table portion 941 in FIGS. 6-8.

The suction pump 90 shown in FIG. 4 is fixed to wall portion 942 shown in FIG. 6. The inlet pipe 91 set on the top portion of the sidewall 62 of egg case 6 is communicated to the drainage-through-hole 67 of egg case 6. An outlet portion of inlet pipe 91 is forced downwardly by a coil spring (not shown) wound on inlet pipe 91. As the result, the outlet portion of inlet pipe 91 is pushed on the top surface of the sidewall 62 of egg case 6. Many connecting method can be employed for connecting inlet pipe 91 to drainage-through-hole 67. For example, the inlet pipe can be moved in the direction H by a lifting actuator.

The water-supplying pipe 92 extends to the direction W. The lower surface of water-supplying pipe 92 has a plurality of small holes for spraying water on one side portion of egg-arranging plate 7. Suction pump 90 sprays water via the water-supplying pipe 92. Inlet pipe 91 is supported by suction pump 90, and water-supplying pipe 92 is supported by wall portion 942.

Moreover, a nozzle-scanning actuator 10 consists of a nozzle-driving actuator 10A and a nozzle-swinging actuator 10B. The nozzle-driving actuator 10A being a linear actuator is fixed on the wall portion 942. The nozzle-swinging actuator 10B is driven in the longitudinal direction L shown in FIG. 6 by nozzle-driving actuator 10A.

Nozzle-swinging actuator 10B has a swinging bar 10C swinging in a two-dimensional space having a direction W and a direction H shown in FIG. 6. The nozzle 11 fixed to the swinging bar 10C is swung with swinging bar 10C by nozzle-swinging actuator 10B. The nozzle 11 scans egg-arranging plate 7 in egg case 6.

Cover plate 8 is abbreviated in FIG. 6. In the other words, nozzle-driving actuator 10A moves nozzle 11 via nozzle-swinging actuator 10B in a direction L. Nozzle-swinging actuator 10B swings nozzle 11 in the direction W.

Accordingly, water flowing out of nozzle 11 is sprayed on the entire upper surface of cover plate 8 equipped on the egg-arranging plate 7. The water flowing out from nozzle 11 is controlled by a control valve (not shown). Fish eggs on cover plate 8 are forced into concave portions 71 of egg-arranging plate 7.

(Operation of Egg-Arranging Apparatus 9)

Figure 9:
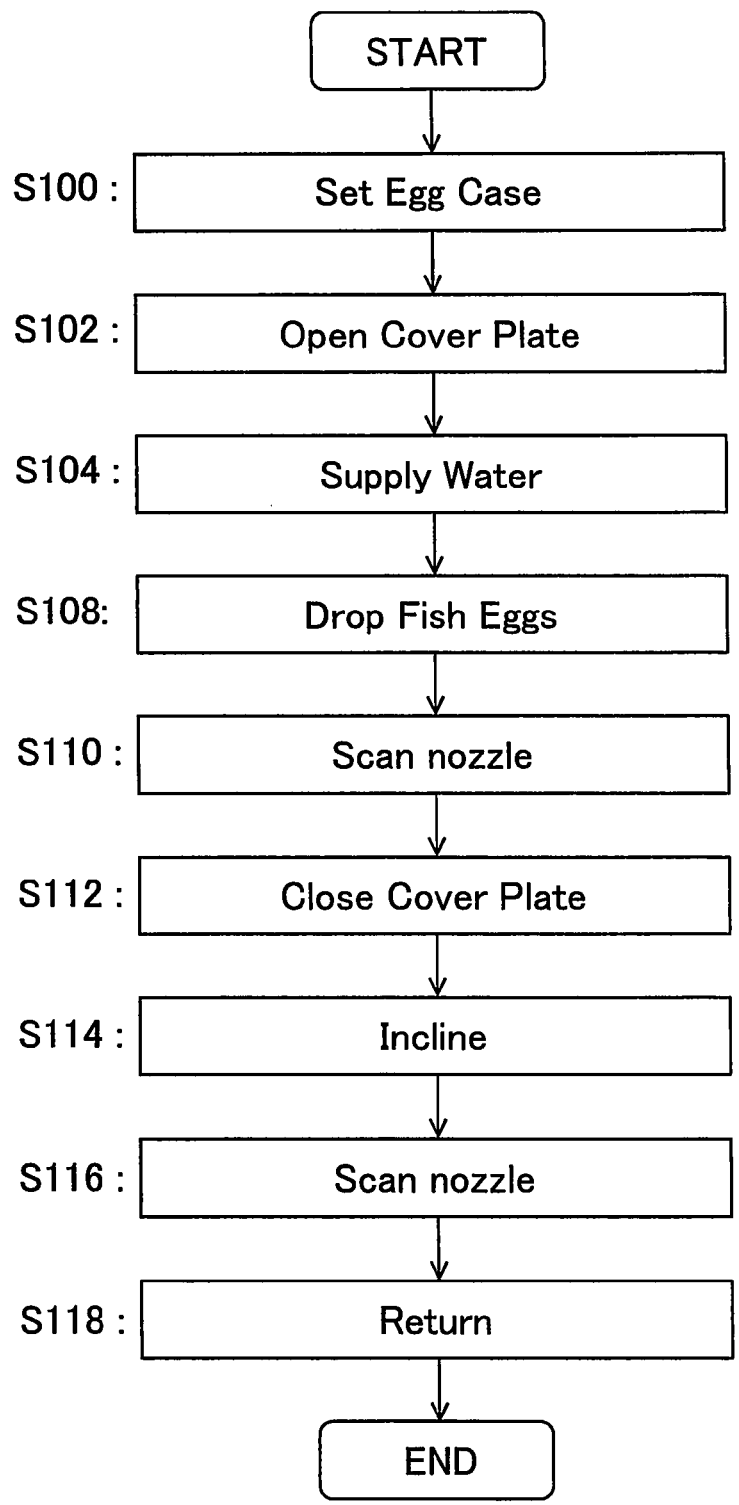
FIG. 9 is a flow chart showing the egg-arranging operation of the embodiment.

The sequential operation of egg-arranging apparatus 9 in this embodiment is explained referring to a flow chart shown in FIG. 9. The operation is controlled by a controller (not shown), which is accommodated in the egg-arranging apparatus 9.

Firstly, one egg case 6 is fixed on a predetermined position on table portion 941, and inlet pipe 91 is communicated to the drainage through-hole 67 at step S100. At next step S102, the cover plate 8 is moved to the first position. Concave portions 71 of egg-arranging plate 7 are opened. At next step S104, suction pump 90 is driven. Water is supplied to the upper surface of plates 7 and 8.

At step S108, water including fish eggs is dropped on plates 7 and 8. At step S110, nozzle 11 is scanned. Water stream drained out from nozzle 11 forces the fish eggs on the plates 7 and 8. Forced fish eggs drop in concave portions 71 of egg-arranging plate 7. At step S112, the cover plate 8 is moved to the second position. Concave portions 71 of egg-arranging plate 7 are closed. At next step S114, egg case 6 is inclined. Remaining water with eggs is drained downwardly.

At step S116, nozzle 11 is scanned again. Water stream drained out from nozzle 11 accelerates dropping of the fish eggs from the plates 7 and 8. At step S118, egg case 6 is swung back to an initial configuration, and water is supplied in egg case 6 again for a predetermined short time.

In the above embodiment, the injection of gene-material is explained. However, any materials can be injected in fish eggs instead of the gene materials.

What is claimed is:

1. A method for processing a large number of fish eggs, providing:
   an egg case having an egg-arranging plate on which a large number of concave portions are formed at predetermined positions on an upper surface of the egg-arranging plate;
   an egg-arranging apparatus for arranging each fish egg into each concave portion of the egg-arranging plate; and
   an injecting apparatus for injecting materials to a large number of the fish eggs arranged in the concave portions;
   wherein the production method comprises the steps of:
   a first case-setting step for setting the egg case at the predetermined arranging position of the egg-arranging apparatus;
   an egg-arranging step for arranging each of fish eggs in each of the concave portions by means of draining water through the concave portions;
   a second case-setting step for setting the egg case at the predetermined injection position of the gene-injecting apparatus; and an injecting step for injecting materials to a large number of the fish eggs arranged in the concave portions of the egg-arranging plate wherein each of the concave portions has each drainage-through-hole through which the water in each of the concave portions flows downwardly; the egg case holds a cover plate capable of sliding on the egg-arranging plate; the cover plate opens the concave portions, when the cover plate is positioned at a first position; and the cover plate closes the concave portions, when the cover plate is positioned at a second position.

2. The production method according to claim 1, wherein the egg case with rectangular-box-shape has sidewalls surrounding and holding the egg-arranging plate and the cover plate, which are arranged in parallel.

3. The method according to claim 1, wherein the cover plate slides to the first position before the egg-arranging step; and the cover plate slides to the second position after the egg-arranging step.

4. The production method according to claim 1, wherein a needle for injecting the gene materials is inserted into the fish eggs in the concave portion through an injection-through-hole arranged to the cover plate.

5. The method according to claim 1, wherein the egg-arranging apparatus has a water-circulating passage for returning water dropping through the concave portion and the drainage-through-hole to an upward position of the egg-arranging plate.

6. An apparatus for processing a very large number of fish eggs, comprising:

an egg case having an egg-arranging plate on which a large number of concave portions are formed at predetermined positions on an upper surface of the egg-arranging plate; and an egg-arranging apparatus for arranging each fish egg into each'concave portion of the egg-arranging plate;

wherein each of the concave portions has each drainage-through-hole through which the water in each of the concave portions flows downwardly;

the egg case holds a cover plate capable of sliding on the egg-arranging plate;

the cover plate opens the concave portions, when the cover plate is positioned at a first position; and the cover plate closes the concave portions, when the cover plate is positioned at a second position.

7. The apparatus according to claim 6, wherein the egg case with rectangular-box-shape has sidewalls surrounding and holding the egg-arranging plate and the cover plate, which are arranged in parallel.

8. The apparatus according to claim 6, wherein the cover plate has injection-through-holes capable of inserting an injection needle into the concave portion.

9. The apparatus according to claim 6, wherein the egg-arranging apparatus has a water-circulating passage for returning water dropping through the concave portion and the drainage-through-hole to an upward position of the egg-arranging plate.

10. The apparatus according to claim 6, wherein the egg case has a slanted slope disposed on one of four inner side surface of the sidewall of the egg case.

* * * * *